United States Patent
Ikeda et al.

(10) Patent No.: US 9,765,836 B2
(45) Date of Patent: Sep. 19, 2017

(54) FRICTION MATERIAL AND METHOD FOR MANUFACTURING SAME

(71) Applicant: JAPAN BRAKE INDUSTRIAL CO., LTD., Hachioji-shi, Tokyo (JP)

(72) Inventors: Takehiko Ikeda, Hachioji (JP); Takenori Abe, Hachioji (JP); Yasuhiro Hara, Mito (JP); Hiroshi Nishie, Oyama (JP); Kohta Nukumizu, Hachioji (JP)

(73) Assignee: JAPAN BRAKE INDUSTRIAL CO., LTD., Tokyo (JP)

( * ) Notice: Subject to any disclaimer, the term of this patent is extended or adjusted under 35 U.S.C. 154(b) by 515 days.

(21) Appl. No.: 14/372,246

(22) PCT Filed: Jan. 16, 2013

(86) PCT No.: PCT/JP2013/050684
§ 371 (c)(1),
(2) Date: Jul. 15, 2014

(87) PCT Pub. No.: WO2013/108789
PCT Pub. Date: Jul. 25, 2013

(65) Prior Publication Data
US 2014/0345990 A1  Nov. 27, 2014

(30) Foreign Application Priority Data
Jan. 16, 2012  (JP) ................................. 2012-006067

(51) Int. Cl.
| F16D 69/02 | (2006.01) |
| B29C 35/00 | (2006.01) |
| B29K 21/00 | (2006.01) |
| F16D 69/00 | (2006.01) |

(52) U.S. Cl.
CPC .............. F16D 69/02 (2013.01); B29C 35/00 (2013.01); F16D 69/026 (2013.01); B29K 2021/00 (2013.01); F16D 2069/002 (2013.01); F16D 2200/0056 (2013.01); F16D 2200/0086 (2013.01); F16D 2250/0023 (2013.01)

(58) Field of Classification Search
CPC ............... F16D 69/02; F16D 2069/002; F16D 2200/0086; F16D 2250/0023; B29C 35/00; B29K 2021/00
See application file for complete search history.

(56) References Cited

U.S. PATENT DOCUMENTS

| 2006/0162259 A1 | 7/2006 | Ono |
| 2007/0023950 A1 | 2/2007 | Chiba et al. |

FOREIGN PATENT DOCUMENTS

| CN | 1748015 | | 3/2006 |
| JP | 60-184533 | A | 9/1985 |
| JP | 04-018483 | A | 1/1992 |
| JP | 4-78509 | | 3/1992 |
| JP | 06-1966 | | 1/1994 |
| JP | 11-106523 | A | 4/1999 |
| JP | 2004-315626 | A | 11/2004 |
| JP | 3809924 | B | 6/2006 |
| JP | 2006-193685 | | 7/2006 |
| JP | 2007-56063 | A | 3/2007 |
| JP | 2009220495 | * | 3/2008 |
| JP | 2009-220495 | A | 10/2009 |
| JP | 2009-227706 | A | 10/2009 |
| JP | 2011-256255 | A | 12/2011 |
| JP | 2013-57337 | A | 3/2013 |

OTHER PUBLICATIONS

English translation of International Preliminary Report of Appln. No. PCT/JP2013/050684 dated Jul. 31, 2014.
Official Action in the counterpart Japanese application No. 2013-005329 dated Aug. 29, 2016 with English translation thereof.
CN Office Action of Appln. No. 201380005620.8 dated Mar. 9, 2015 with English translation.

\* cited by examiner

*Primary Examiner* — Stella Yi
(74) *Attorney, Agent, or Firm* — Fitch, Even, Tabin & Flannery, LLP

(57) ABSTRACT

Using a friction material composition comprising: a fiber; a friction adjusting material; a binding material; and an uncrosslinked rubber being solid at normal temperature (25° C.), a friction material is obtained, wherein an ambient compressibility in a piston-pressing direction is 2% or less at normal temperature (25° C.) and at 4 MPa, and a tan δ value in a sliding direction at −20° C. to 50° C. is 0.05 or larger. Thereby, a friction material which has high damping properties and acceptable brake noise, which can prevent a decrease in responsiveness when brakes are applied, and prevent a decrease in the feeling of effectiveness associated therewith, and which can suppress a decrease in the fuel efficiency and an increase in abrasion caused by the dragging occurring when the friction material is brought into contact with a brake rotor; and a method for producing the friction material, can be provided.

7 Claims, No Drawings

FRICTION MATERIAL AND METHOD FOR MANUFACTURING SAME

TECHNICAL FIELD

The present invention relates to a friction material that is used for the disc-brake pads used in the brakes of two-wheeled vehicles or four-wheeled vehicles, electromagnetic brakes, and industrial brakes.

BACKGROUND ART

Friction materials that are used for the disc-brake pads used in the brakes of two-wheeled vehicles or four-wheeled vehicles, electromagnetic brakes and industrial brakes, are required to be acceptable in terms of characteristics such as effectiveness, abrasion resistance, brake noise, and judder which is a forced vibration resulting from a thickness deviation in the rotor.

Particularly, brake noise characteristic is important in connection with the comfortability of brakes. In order to ameliorate brake noise, it is effective to enhance the damping properties (tan δ) of the friction material used in the brakes. Therefore, it has been proposed to enhance the damping properties of a friction material by a method of softening the resin used as a binding material by using an acrylic elastomer and a nitrile rubber; a method of adding a rubber powder, cashew dust and the like as a material of a friction adjusting material to decrease the elastic modulus of the friction material; and the like (see, for example, Patent Literatures 1 and 2).

CITATION LIST

Patent Literature

Patent Literature 1: Japanese Patent Application Laid-open No. Sho 60-184533A
Patent Literature 2: Japanese Patent Publication No. 3809924

SUMMARY OF INVENTION

Technical Problem

However, when the elastic modulus of a friction material is decreased by using such a method, the amount of deformation of the friction material in the piston-pressing direction at the time of applying brakes is increased, and there occurs a decrease in responsiveness and a decrease in the feeling of effectiveness associated therewith (decrease in responsiveness), and the like. Furthermore, if the amount of deformation is too large, the disc-brake pad does not return to the original position after brakes are applied, and the friction material is in contact with the brake rotor and then is dragged, which brings about a decrease in fuel efficiency and an increase in abrasion.

An object of the present invention is to provide a friction material that solves the problems described above. Specifically, it is an object of the invention to provide a friction material which has high damping properties and acceptable brake noise, and which can suppress a decrease in responsiveness when brakes are applied, a decrease in the feeling of effectiveness associated therewith, a decrease in fuel efficiency and an increase in abrasion occurring as a result of dragging of the friction material and a brake rotor, and to provide a method for producing the friction material.

Solution to Problem

The present invention relates to the following:

(1) A friction material obtainable by molding a friction material composition containing: a fiber, a friction adjusting material; and an uncrosslinked rubber being solid at normal temperature (25° C.),
wherein an ambient compressibility is 2% or less when the friction material is compressed in a piston-pressing direction at normal temperature (25° C.) and at 4 MPa, and
a tan δ value in a sliding direction at −20° C. to 50° C. is 0.05 or larger.

(2) The friction material as described in the above item (1),
wherein a proportion of the uncrosslinked rubber is within the range of 0.5% to 10% by mass relative to the total amount of the friction material composition,
the fiber includes one kind, or two or more kinds selected from the group consisting of a metal fiber, an inorganic fiber and an organic fiber, a proportion of the metal fiber is 8% by mass or less relative to the total amount of the friction material composition, and
a proportion of an organic filler material in the friction adjusting material is 1% by mass or less relative to the total amount of the friction material composition.

(3) A method for producing the friction material as described in the above item (1) or (2), the method including:
a mixing step of mixing the friction material composition containing the fiber, the friction adjusting material, the binding material, and the uncrosslinked rubber at a proportion of 0.5% to 5% by mass relative to the total amount of the friction material composition;
a molding step of heat and press-molding an obtained mixture to yield a molded product; and
a heat treating step of heat-treating the molded product to cure the binding material in the molded product.

(4) A method for producing the friction material as described in the above item (1) or (2), the method including:
a mixing step of mixing the friction material composition containing the fiber, the friction adjusting material, the binding material, and the uncrosslinked rubber at a proportion of 1% to 10% by mass relative to the total amount of the friction material composition;
a molding step of press-molding an obtained mixture at a pressure of 50 MPa or higher at a temperature (0° C. to 90° C.) at which the binding material does not react, to yield a molded product; and
a heat-treating step of heat-treating the molded product to cure the binding material in the molded product.

(5) The method for producing the friction material as described in the above item (3) or (4), wherein in the mixing step, the uncrosslinked rubber is mixed with all materials of the friction material composition other than the uncrosslinked rubber.

(6) The method for producing the friction material as described in the above item (3) or (4), wherein in the mixing step, the uncrosslinked rubber is mixed with a portion of materials of the friction material composition other than the uncrosslinked rubber, and then a mixed material is further mixed with a remaining material of the friction material composition.

Advantageous Effects of Invention

According to the present invention, a friction material which has high damping properties and acceptable brake noise, which can prevent a decrease in responsiveness when brakes are applied, and prevent a decrease in the feeling of effectiveness associated therewith, and which can suppress a decrease in the fuel efficiency and an increase in abrasion caused by the dragging that occurs when the friction material is brought into contact with a brake rotor; and a method for producing the friction material, can be provided.

The disclosure of the present application relates to the subject matter described in Japanese Patent Application No. 2012-006067 filed Jan. 16, 2012, the disclosure of which is incorporated herein by reference.

DESCRIPTION OF EMBODIMENTS

<1> Friction Material of the Present Invention

Hereinafter, the friction material of the present invention will be described in detail.

The friction material of the present invention is a friction material obtainable by molding a friction material composition containing: a fiber; a friction adjusting material; a binding material; and an uncrosslinked rubber being solid at normal temperature (25° C.), characterized in that the ambient compressibility is 2% or less when the friction material is compressed in the piston-pressing direction at normal temperature (25° C.) and at 4 MPa, and the tan δ value in the sliding direction at −20° C. to 50° C. is 0.05 or larger.

In order for the friction material to have the above-described characteristics, it is preferable that the proportion of the uncrosslinked rubber is within the range of 0.5% to 10% by mass relative to the total amount of the friction material composition, the fiber includes one kind, or two or more kinds selected from the group consisting of a metal fiber, an inorganic fiber and an organic fiber, while the proportion of the metal fiber is 8% by mass or less relative to the total amount of the friction material composition and the proportion of an organic filler material in the friction adjusting material is 1% by mass or less relative to the total amount of the friction material composition.

More specifically, when a friction material containing an uncrosslinked rubber being solid at normal temperature (25° C.) at a proportion of 0.5% to 5% by mass is used, a friction material having the characteristics described above can be easily obtained by heat and press-molding to yield a molded product, and then heat-treating the molded product. Furthermore, when a friction material composition containing an uncrosslinked rubber being solid at normal temperature (25° C.) at a proportion of 1% to 10% by mass is used, a friction material having the characteristics described above can be easily obtained by press-molding to yield a molded product at a pressure of 50 MPa or higher at a temperature (0° C. to 90° C.) at which the binding material does not react, and then heat-treating the molded product. The details will be explained in the method section <3> for producing the friction material of the present invention.

Hereinafter, each of the materials of the friction material composition according to the present invention will be explained.

<Fiber>

The friction material composition according to the present invention contains two or more kinds selected from the group consisting of a metal fiber, an inorganic fiber and an organic fiber as a fiber, and it is preferable that the proportion of the metal fiber be 8% by mass or less relative to the total amount of the friction material composition.

When the proportion of the metal fiber is adjusted to 8% by mass or less relative to the total amount of the friction material composition, the present invention is directed to friction materials of low-steel and non-steel.

Regarding the fiber according to the present invention, any metal fiber, inorganic fiber, organic fiber or the like that is usually used in friction material compositions can be used.

Examples of the metal fiber include a copper fiber, a brazen fiber, a steel fiber, a brass fiber, an aluminum fiber and the like. When the metal fiber is added, the thermal conductivity of the friction material is increased, and in the present invention in which the uncrosslinked rubber described above is contained in the friction material composition, the friction material is prone to thermally deteriorate. Therefore, the amount of the metal fiber is preferably 8% by mass or less, and more preferably 5% by mass or less, relative to the total amount of the friction material composition.

Examples of the inorganic fiber include an alumina fiber, an alumina-silica fiber, a glass fiber, a mineral fiber, a ceramic fiber and the like.

Examples of the organic fiber include an aramid fiber, an acrylic fiber, a cellulose fiber, a carbon fiber, a phenolic resin fiber, a polyimide fiber and the like.

The additive amount of the fiber is not particularly limited but is preferably in the range of 1% to 50% by mass, and more preferably in the range of 2% to 40% by mass, relative to the total amount of the friction material composition.

<Friction Adjusting Material>

Regarding the friction adjusting material according to the present invention, any inorganic filler material, organic filler material or the like that is usually used in friction material compositions can be used.

Examples of the inorganic filler material include zirconia, alumina, silica, barium sulfate, calcium carbonate, mica, potassium titanate, graphite, antimony trioxide, antimony disulfide and the like.

Examples of the organic filler material include cashew dust and the like. An organic filler material maintains the shape to be particulate, and has a property of expanding in the piston-pressing direction of the friction material when the friction material is molded. Therefore, when the proportion is adjusted to 1% by mass or less, the ambient compressibility of the obtained friction material can be set to 2% or less. The additive amount of the organic filler material is more preferably 0.5% by mass or less relative to the total amount of the friction material composition.

These friction adjusting materials can be used singly, or in combination of two or more kinds. The additive amount of the friction adjusting material is not particularly limited but is preferably in the range of 35% to 95% by mass, and more preferably in the range of 50% to 80% by mass, relative to the total amount of the friction material composition.

<Binding Material>

Regarding the binding material according to the present invention, any thermosetting resin that is usually used in friction material compositions can be used, but a thermosetting resin that does not react at 0° C. to 90° C. is preferred. Examples of the thermosetting resin that does not react at 0° C. to 90° C. include a phenolic resin, an imide resin, a melamine resin, an epoxy resin and the like.

Meanwhile, the phrase "does not react at 0° C. to 90° C." means that the monomer serving as a raw material of the resin used as a binding material does not undergo a thermosetting reaction.

These binding materials can be used singly or in combination of two or more kinds. The content of the binding material is preferably in the range of 2% to 20% by mass, and more preferably in the range of 5% to 15% by mass, relative to the total amount of the friction material composition.

<Uncrosslinked Rubber being Solid at Normal Temperature (25° C.)>

The rubber according to the present invention is not particularly limited as long as it is an uncrosslinked rubber being solid at normal temperature (25° C.), and it is preferable to use a rubber having strong tacky adhesiveness. Examples of the uncrosslinked rubber being solid at normal temperature include natural rubber, isoprene rubber, butadiene rubber, styrene-butadiene rubber, acrylonitrile-butadiene rubber, butyl rubber, chlorinated butyl rubber, ethylene-propylene-diene rubber, fluororubber and the like.

These can be used singly or in combination of two or more kinds. According to the present invention, among the rubbers described above, acrylonitrile-butadiene rubber, butyl rubber, chlorinated butyl rubber and the like, which have high adhesiveness at normal temperature and have excellent heat resistance, are preferably used. When such a rubber is used, a friction material having excellent tacky adhesiveness at a temperature (0° C. to 90° C.) at which the binding material does not react and having excellent heat resistance can be obtained.

The amount of the uncrosslinked rubber being solid at normal temperature (25° C.) is preferably in the range of 0.5% to 10% by mass relative to the total amount of the friction material composition. If the amount is less than 0.5% by mass, it is difficult to increase the tan δ value, and it is also difficult to mix the rubber into the entire friction material composition uniformly. As the additive amount of the uncrosslinked rubber being solid at normal temperature (25° C.) increases, the damping rate increases, and thus brake noise can be suppressed. If the additive amount of the uncrosslinked rubber being solid at normal temperature (25° C.) is more than 10% by mass, heat resistance and strength tend to be decreased, and abrasion resistance tends to deteriorate.

According to the present invention, the uncrosslinked rubber being solid at normal temperature, which is included in the friction material composition, flows in a direction perpendicular to the pressing direction when press-molding is performed (before heat treatment), that is, spreads in the in-plane direction of the friction surface of the friction material. Therefore, the ambient compressibility of the friction material obtainable by molding the friction material composition can be made smaller.

It is contemplated that in regard to the uncrosslinked rubber being solid at normal temperature, when the resin used as a binding material of the friction material composition is cured by the heat-treating step of the method for producing a friction material to form a friction material, the uncrosslinked rubber is partially reacted. If rubber has flowed in a direction perpendicular to the pressing direction as a result of press-molding of the molding step, crosslinking of the uncrosslinked rubber being solid at normal temperature may be carried out before the heat-treating step, and in that case, a sulfur- or peroxide-crosslinking agent, and/or a crosslinking accelerator may be added thereto. When the crosslinking agent and/or the crosslinking accelerator is added, heat resistance of the uncrosslinked rubber being solid at normal temperature can be enhanced.

<2> Properties of Friction Material of Present Invention

<Ambient Compressibility>

The friction material of the present invention is such that the ambient compressibility is 2% or less when the friction material is compressed in the piston-pressing direction at normal temperature (25° C.) and at 4 MPa.

The ambient compressibility according to the present invention is a value obtained by processing the friction material into a shape having 25 mm on each side (longitudinal: 25 mm, horizontal: 25 mm) with a thickness of 5 mm in order to eliminate the influence of the strain of a back plate, the shape of the friction material and the like, and measuring the ambient compressibility in the thickness direction at normal temperature (25° C.) and at 4 MPa. If the ambient compressibility exceeds 2%, responsiveness at the time when brakes are applied and the feeling of effectiveness associated therewith are decreased, and this tends to bring about a decrease in fuel efficiency caused by dragging of the brake pad and the rotor and an increase in abrasion.

In order to adjust the ambient compressibility of the friction material to 2% or less, the friction material may be produced using the production method that will be described below, by employing the particular materials described above as each of the materials of the friction material composition.

<tan δ>

The friction material of the present invention has a tan δ value in the sliding direction at −20° C. to 50° C. of 0.05 or larger.

In order to adjust the tan δ value of the friction material to 0.05 or larger, the friction material may be produced using the production method that will be described below, by employing the particular materials described above as each of the materials of the friction material composition.

The tan δ value according to the present invention is measured by a dynamic viscoelasticity analyzer (DMA). The tan δ in a dynamic viscosity analysis is a value defined as the ratio between the loss elastic modulus and the storage elastic modulus of a material.

The storage elastic modulus of a material is defined as the ratio of strain and elastic stress of the same phase thereof, and is related to the ability of the material to elastically store energy.

The loss elastic modulus is the ratio of strain and elastic stress of a different phase thereof, and corresponds to the ability of the material to thermally scatter the stress. In general, a higher tan δ value is accompanied by a high damping rate.

The tan δ of friction materials used in conventional disc-brake pads represents values of 0.04 or less.

<3> Method for Producing Friction Material of Present Invention

The method for producing the friction material of the present invention is characterized by including:

a mixing step of mixing a friction material composition containing the fiber, the friction adjusting material, the binding material, and the uncrosslinked rubber at a proportion of 0.5% to 5% by mass relative to the total amount of the friction material composition;

a molding step of heat and press-molding an obtained mixture to yield a molded product; and a heat-treating step of heat-treating the molded product to cure the binding material in the molded product (hereinafter, referred to as "Production Method 1").

Furthermore, another method for producing the friction material of the present invention is characterized by including:

a mixing step of mixing a friction material composition containing the fiber, the friction adjusting material, the binding material, and the uncrosslinked rubber at a proportion of 1% to 10% by mass relative to the total amount of the friction material composition;

a molding step of press-molding an obtained mixture at a pressure of 50 MPa or higher at a temperature (0° C. to 90° C.) at which the binding material does not react; and a heat-treating step of heat-treating the molded product to cure the binding material in the molded product (hereinafter, referred to as "Production Method 2").

When the uncrosslinked rubber is contained in the friction material composition at a proportion of 0.5% to 5% by mass, it is preferable to produce the friction material by the Production Method 1 which performs, after the molding step of heat and press-molding the mixture to yield the molded product, the heat-treating step of heat-treating the molded product to cure the binding material in the molded product.

When the uncrosslinked rubber is contained in the friction material composition at a proportion of 1% to 10% by mass, it is preferable to produce the friction material by the Production Method 2 which performs, after the molding step of press-molding the mixture at a pressure of 50 MPa or higher at the temperature (0° C. to 90° C.) at which the binding material does not react, the heat-treating step of heat-treating the molded product to cure the binding material in the molded product.

The method of molding at the temperature at which the binding material does not react, allows a friction material having a stable quality to be obtained in a short time, as compared with the conventional method for molding a friction material by performing thermal molding.

When the resin used as a binding material reacts, gelling occurs, and the friction material flows. Therefore, on the occasion of thermally curing the friction material, if the amount of the uncrosslinked rubber is large, the friction material composition tends to become firm (to shrink). On the contrary, if the amount of the uncrosslinked rubber is small, it is not possible to mold by press-molding, and so it is preferable to perform heating and pressing (specifically, molding by heating at 130° C. to 200° C. and by pressing at 5 MPa to 40 MPa).

When the method described above is used, the ambient compressibility of the friction material can be adjusted to 2% or less, and the tan δ value in the sliding direction at −20° C. to 50° C. to 0.05 or larger. Meanwhile, in case that the same materials are used for the friction material compositions, the ambient compressibility tends to decrease when the temperature is high in the molding conditions, and the ambient compressibility tends to decrease when the pressure is high.

Regarding the method (Production Method 1) of conducting the molding step by subjecting a friction material composition containing the uncrosslinked rubber at a proportion of 0.5% to 5% by mass to heat and press-molding (specifically, molding by heating at 130° C. to 200° C. and by pressing at a pressure of 5 MPa to 40 MPa), and then conducting the heat-treating step, a specific example may be the following method.

First, as the molding step, a preliminary molded product capable of handling is produced by pressing a friction material composition in a preliminary molding mold at a pressure of 3 MPa to 30 MPa. In the case of a disc-brake pad, the preliminary molded product is heat and press-molded integrally with a back plate at a temperature of 130° C. to 200° C., at which the binding material in the friction material composition reacts, and thus a molded product is obtained. The molding pressure may be in the range of 5 MPa to 40 MPa, and the molding time may be 1 minute to 10 minutes. With such a molding pressure, the uncrosslinked rubber flows perpendicularly to the pressing direction, and thereby a friction material having a high damping rate can be obtained, even though its compressive strain is small.

Subsequently, for the heat-treating step, the molded product thus obtained is heat-treated at 180° C. to 250° for 1 hour to 10 hours to yield a friction material. In heat-treating at a temperature of lower than 180° C., the binding material is not sufficiently cured, and in heat-treating at 250° C. or higher, the uncrosslinked rubber contained in the friction material composition tends to deteriorate. The friction material thus obtained is subjected to painting and polishing as necessary, and is formed into a predetermined shape/form.

Regarding conventional disc-brake pads, the friction material surface may be subjected to a scorching treatment at 400° C. or higher in the production process in order to prevent the fade phenomenon caused by decomposition of phenolic resins during use; however, in the case of the friction material of the present invention, since the binding material is not easily decomposed, the fade phenomenon is not likely to be manifested. Therefore, usually, a scorching treatment is not particularly necessary.

Regarding the method (Production Method 2) of conducting the molding step by subjecting a friction material composition containing the uncrosslinked rubber at a proportion of 1% to 10% by mass to press-molding at 50 MPa or higher at the temperature (0° C. to 90° C.) at which the binding material does not react, and then conducting the heat-treating step, a specific example may be the following method.

First, as the molding step, a back plate is installed in a mold, molding is carried out in a short time by applying a high pressure of 50 MPa or higher at the temperature (0° C. to 90° C.) at which the binding material does not react, by utilizing the tacky adhesiveness of the uncrosslinked rubber. Preferably, when the molding temperature is set to the range of 40° C. to 60° C., the flow of the friction material composition becomes constant, and a product having a uniform density can be produced.

The molding pressure is preferably in the range of 80 MPa to 150 MPa, and it is preferable to perform molding for a molding time of 1 second to 60 seconds. With such a molding pressure, the uncrosslinked rubber flows perpendicularly to the pressing direction, and thereby a friction material having a high damping rate can be obtained, even though its compressive strain is small.

Subsequently, for the heat-treating step, the molded product thus obtained is heat-treated at 180° C. to 250° C. for 1 hour to 10 hours to yield a friction material. In heat-treating at a temperature of lower than 180° C., the binding material is not sufficiently cured, and in heat-treating at 250° C. or higher, the uncrosslinked rubber included in the friction material composition tends to deteriorate. When heat-treating is carried out by this production method, expansion of the friction material is suppressed if heat-treating is carried out while pressing the friction material at a low pressure during heat-treating.

The friction material thus obtained is subjected to painting and polishing as necessary, and is formed into a predetermined shape/form. In the aspect that when the present invention is used in disc-brake pads, a scorching treatment is unnecessary, the same applies as in the case of the heat and press-molded product.

For a friction material composition containing the uncrosslinked rubber at a proportion of 1% to 5% by mass, a friction material can be produced by any of the Production Method 1 and the Production Method 2; however, from the viewpoint that molding can be carried out in a short time, the Production Method 2 is preferred.

According to the present invention, in the mixing step, the uncrosslinked rubber is mixed with all of the materials of the friction material composition other than the uncrosslinked rubber. Alternatively, in the mixing step, the uncrosslinked rubber is mixed with a portion of the materials of the friction material composition other than the uncrosslinked rubber, and then a mixed material may be further mixed with a remaining material of the friction material composition.

In regard to the mixing step, the mixing method is not particularly limited, since the friction material composition contains the uncrosslinked rubber, a general rubber kneading apparatus can be used.

Examples of the rubber kneading apparatus include a pressurized kneader, a Banbury mixer, an open roll and the like. Particularly, internal mixers (sealed type kneading machine) such as a pressurized kneader and a Banbury mixer are preferred because the uncrosslinked rubber can be uniformly dispersed in the friction material composition regardless of the amount of the uncrosslinked rubber.

When the uncrosslinked rubber and each of the materials of the friction material composition other than the uncrosslinked rubber are kneaded, if a solvent is used, a drying step is required; therefore, it is preferable not to use a solvent.

In the mixing step of mixing each of the materials of the friction material composition, for example, in the case of using an internal mixer, there are no particular limitations on the order of introduction of each of the materials of the friction material composition, and all the materials can be fed at once and kneaded.

However, from the viewpoint of reducing segregation of the material, it is preferable to mix in advance each of the materials of the friction material composition other than the uncrosslinked rubber, and then to knead the uncrosslinked rubber.

Furthermore, in the mixing step, when the uncrosslinked rubber being solid at normal temperature is dispersed, heat is generated. Therefore, if both the uncrosslinked rubber and the binding material are included as materials of the friction material composition to be mixed, a reaction between the binding material and the uncrosslinked rubber occurs, so that the binding material may not contribute in the molding step of the friction material, and cracks or creases may be generated. From this point of view, in regard to the uncrosslinked rubber as well as the binding material, when each of the materials of the friction material composition other than the uncrosslinked rubber and the binding material are first preliminarily mixed, subsequently the uncrosslinked rubber is added and mixed, and then the binding material is added and mixed into a mixed material, such a problem does not occur, and thus it is preferable.

As described above, regarding the mixing step, a method of stirring each of the materials of the friction material composition together; a method of mixing in advance each of the materials of the friction material composition other than the uncrosslinked rubber, subsequently adding the uncrosslinked rubber, and kneading the mixture; a method of mixing in advance each of the materials of the friction material composition other than the uncrosslinked rubber and a binding material, subsequently mixing the uncrosslinked rubber, and then adding and mixing a binding material into a mixed material; and the like can be used. In order to further increase the strength of the friction material, a method of first mixing in advance each of the materials of the friction material composition other than the uncrosslinked rubber and the binding material, subsequently, adding and kneading the uncrosslinked rubber thereto, and finally adding and mixing a binding material, is preferred.

In the case of performing the mixing step by first mixing in advance each of the materials of the friction material composition other than the uncrosslinked rubber and the binding material, subsequently adding and kneading the uncrosslinked rubber thereinto, and finally adding and mixing the binding material thereinto, the proportion of the materials of the friction material composition other than the uncrosslinked rubber and the binding material, which are intended for preliminarily mixing with the uncrosslinked rubber, may be set to 50% by mass or more relative to the total amount of the friction material composition.

In this manner, the uncrosslinked rubber can be uniformly dispersed in the materials of the friction material composition other than the uncrosslinked rubber and the binding material. When the uncrosslinked rubber is preliminarily mixed with the materials of the friction material composition other than the uncrosslinked rubber and the binding material, since the uncrosslinked rubber is uniformly dispersed in the friction material composition that has been preliminarily mixed in advance (excluding the uncrosslinked rubber and the binding material), mixing of the binding material can be carried out using a general powder stirring machine. For example, mixing can be carried out using a Loedige mixer, a Henschel mixer, an Eirich mixer, and a V-type mixer.

The friction material of the present invention can be used as, for example, a friction material of disc-brake pads of motor vehicles and the like, electronic brakes, holding brakes, and the like.

EXAMPLES

Examples 1 to 6 and Comparative Example 1

Hereinafter, the present invention will be described in more detail by way of the Examples and Comparative Example indicated in Table 1, but the present invention is not intended to be limited to these.

TABLE 1

| | Item | Example 1 | Example 2 | Example 3 | Example 4 | Example 5 | Example 6 | Comparative Example 1 |
|---|---|---|---|---|---|---|---|---|
| Material for primary mixture (% by mass) | Copper fiber | 8 | 8 | 8 | 8 | 8 | 8 | 8 |
| | Rockwool | 10 | 10 | 10 | 10 | 10 | 10 | 10 |
| | Aramid fiber | 4 | 4 | 4 | 4 | 4 | 4 | 4 |
| | Barium sulfate | 38 | 38 | 38 | 39.5 | 31 | 29 | 36 |
| | Graphite | 10 | 10 | 10 | 10 | 10 | 10 | 10 |
| | Zirconia | 20 | 20 | 20 | 20 | 20 | 20 | 20 |
| | Cashew dust | 0 | 0 | 0 | 1 | 0 | 0 | 5 |
| | Chlorinated butyl rubber | 3 | 3 | 3 | 0.5 | 10 | 12 | 0 |
| | Phenolic resin | 7 | 0 | 0 | 0 | 0 | 0 | 0 |

TABLE 1-continued

| Item | | Example 1 | Example 2 | Example 3 | Example 4 | Example 5 | Example 6 | Comparative Example 1 |
|---|---|---|---|---|---|---|---|---|
| Material for secondary mixture (% by mass) | Phenolic resin | 0 | 7 | 7 | 7 | 7 | 7 | 7 |
| Molding condition | Temperature (° C.) | 50 | 50 | 150 | 150 | 50 | 50 | 150 |
| | Time (seconds) | 10 | 10 | 300 | 300 | 10 | 10 | 300 |
| | Pressure (MPa) | 100 | 100 | 20 | 20 | 100 | 100 | 20 |
| | Ambient compressibility (%) | 0.71 | 0.69 | 0.62 | 0.58 | 0.80 | 0.92 | 1.16 |
| tanδ | −20° C. | 0.059 | 0.058 | 0.057 | 0.052 | 0.061 | 0.069 | 0.033 |
| | 0° C. | 0.078 | 0.076 | 0.075 | 0.068 | 0.080 | 0.092 | 0.052 |
| | 50° C. | 0.058 | 0.057 | 0.057 | 0.052 | 0.058 | 0.061 | 0.041 |
| | Shear strength (kN) | 16 | 18 | 18 | 20 | 15 | 10 | 22 |

<Preparation of Friction Material Composition>

Regarding the friction material compositions of Examples 1 to 6 and Comparative Example 1, the respective friction material compositions were obtained by the process described below, using the raw materials of the friction material compositions and amounts of incorporation thereof as indicated in Table 1.

[1] In the friction material composition indicated in Table 1 as the materials for the primary mixture, the materials excluding chlorinated butyl rubber were dry-mixed for 7 minutes using a Loedige mixer, and thus a primary mixture was obtained.

[2] Next, the primary mixture obtained in the above step [1] and chlorinated butyl rubber (manufactured by JSR Corp., trade name: CHLOROBUTYL 1066) were kneaded for 30 minutes with a pressurized kneader, and thus a mixture was obtained.

[3] Next, in Examples 2 to 6 and Comparative Example 1, the mixture obtained in the above step [2] and a material for the secondary mixture indicated in Table 1 were dry-mixed for 7 minutes using a Loedige mixer.

<Production of Friction Material>

A back plate was mounted in a mold, a friction material composition was introduced into the mold, and a disc-brake pad having a friction area of 60 cm² and a thickness of 16 mm (back plate thickness: 6 mm) was molded.

In regard to the friction materials of Examples 1, 2, 5 and 6 indicated in Table 1, a pulverulent friction material composition obtained in the process described above was introduced directly into the cavity of the mold in which the back plate was mounted. Press-molding was carried out at a molding temperature of 50° C. and a molding pressure of 100 MPa for a molding time of 10 seconds. The molded friction material was heat-treated in an electric furnace at a temperature of 225° C. for 5 hours, and thus the phenolic resin used as a binding material of the friction material composition was cured. The surface was polished using a polishing machine, and thus a friction material having a predetermined thickness was obtained.

In regard to the friction material compositions of Examples 3 and 4, and Comparative Example 1 indicated in Table 1, a pulverulent friction material composition obtained by the process described above was first preliminarily molded at normal temperature, and then was introduced into the cavity of the mold in which the back plate was mounted. Heat and press-molding was carried out at a molding temperature of 150° C. and a molding pressure of 20 MPa for a molding time of 5 minutes. The molded friction material was heat-treated in an electric furnace at a temperature of 225° C. for 5 hours, and thus the phenolic resin used as a binding material of the friction material composition was cured. The surface was polished using a polishing machine, and thus a friction material having a predetermined thickness was obtained.

The characteristics of the fiction materials of Examples 1 to 6 and Comparative Example 1 produced as described above were measured, and are summarized in the lower row of Table 1. Each of the characteristics was measured as follows.

<Measurement of Ambient Compressibility>

Each of the friction materials of the Examples and the Comparative Example produced by the method described above was cut and processed to a size having 25 mm on each side (longitudinal: 25 mm, horizontal: 25 mm) and a thickness of 5 mm. The amount of deformation in the thickness direction of time when a friction material specimen was pressed at normal temperature (25° C.) and 4 MPa, was measured with a dial gauge by using a precision material testing machine manufactured by Shimadzu Corp., trade name: AUTOGRAPH AG-5000C ("AUTOGRAPH" is a registered trademark). The ambient compressibility was indicated as the proportion of deformation relative to the thickness (5 mm) before pressing.

<Measurement of tan δ>

Each of the friction materials of the Examples and the Comparative Example produced by the method described above was cut in parallel to the sliding surface and processed into a specimen having a length of 50 mm, a width of 10 mm, and a thickness of 2 mm.

The test sample was subjected to the measurement of tan δ in the dual cantilever bending mode (measurement frequency: 1 Hz) by using a dynamic viscoelasticity analyzer manufactured by Seiko Instruments, Inc., trade name: DMA 6100.

<Method for Measuring Shear Strength>

The shear strengths of the friction materials of the Examples and the Comparative Example produced by the method described above were measured according to JIS D4422-2007. Each of the friction materials of the Examples and the Comparative Example produced by the method described above was pressed at a crosshead movement speed of 10 mm/min until the sample was completely destroyed, and the maximum load at the time point of destruction was measured.

<Measurement Results>

The following was found from the measurement results of Table 1.

The friction material described in Comparative Example 1 represents a representative composition of friction materials that have been conventionally used. A phenolic resin is used as a binding material, and cashew dust is used in order to increase flexibility of the friction material. Although the ambient compressibility is 1.16%, since the tan δ value at −20° C. to 50° C. is as low as 0.033 to 0.052, brake noise frequently occurs.

The friction material described in Example 1 is a material obtained by excluding cashew dust used in the friction material of Comparative Example 1, and using 3% by mass of chlorinated butyl rubber instead thereof. In addition, Example 1 was molded at 50° C.

The ambient compressibility is as small as 0.71% compared with 1.16% of Comparative Example 1, the tan δ value at −20° C. to 50° C. is as large as 0.059 to 0.078, and the specimen has excellent brake noise performance. The shear strength is decreased by 6 kN as compared with Comparative Example 1, but it was understood that sufficient strength can be secured.

The friction material described in Example 2 was produced in the same manner as in Example 1, except that the phenolic resin as a binding material was introduced later by secondary mixing. Example 2 was molded at 50° C. The ambient compressibility and the tan δ value were equivalent to those of Example 1, and the ambient compressibility is 0.69% and a tan δ value at −20° C. to 50° C. is as large as 0.058 to 0.076, and the friction material of Example 2 has excellent brake noise performance. The shear strength is poorer than Comparative Example 1, but since the phenolic resin was incorporated by secondary mixing, the shear strength increased by 2 kN as compared with Example 1.

The friction material described in Example 3 was produced in the same manner as in Example 2, except that the friction material was heat and press-molded at 150° C. The ambient compressibility is 0.62%, and it was confirmed that the ambient compressibility decreased to a large extent as compared with 1.16% of Comparative Example 1. The tan δ value at −20° C. to 50° C. is 0.057 to 0.075, which is larger compared with 0.033 to 0.052 of Comparative Example 1, and the friction material is advantageous in terms of brake noise.

That is, it was found that a friction material having a small ambient compressibility and a large tan δ value can be obtained by uniformly dispersing a rubber being solid at normal temperature (25° C.).

In Example 4, the uncrosslinked rubber was added at a proportion of 0.5% by mass relative to the total amount of the friction material composition, and for the purpose of adjusting the ambient compressibility, cashew dust was added at a proportion of 1% by mass relative to the total amount of the friction material composition. This friction material composition was heat and press-molded, and thereby a friction material was obtained. In this case, the ambient compressibility is 0.58%, and is smaller than that of the Comparative Example 1. The tan δ value at −20° C. to 50° C. is 0.052 to 0.068, and even though the tan δ value was decreased, a tan δ increasing effect caused by the addition of uncrosslinked rubber was obtained.

Furthermore, in Example 5, uncrosslinked rubber was added at a proportion of 10% by mass relative to the total amount of the friction material composition, and a friction material was obtained by molding at 50° C. In this case, the ambient compressibility is 0.80%, and this is slightly large but smaller than Comparative Example 1. The tan δ value at −20° C. to 50° C. is 0.058 to 0.080, which was the largest. The shear strength decreased to 15 kN, but it was found that sufficient strength can be secured.

In Example 6 in which the amount of the uncrosslinked rubber was increased to 12% by mass relative to the total amount of the friction material composition, the shear strength decreased to 10 kN, but no cracking was observed after the heat treatment, and it was found that there was no problem using the material composition as a friction material.

From the results described above, it was found that when the additive amount of the uncrosslinked rubber is 0.5% by mass or more, a tan δ increasing effect can be obtained, and when the additive amount of the uncrosslinked rubber is 10% by mass or less, shear strength can be secured. The ambient compressibility did not fluctuate largely with the additive amount of the uncrosslinked rubber, and when the amount of the uncrosslinked rubber was between 0.5% by mass and 3% by mass, the ambient compressibility rather tended to decrease.

Furthermore, it was preferable to add the binding material (phenolic resin) by secondary mixing, from the viewpoint of retaining the shear strength.

INDUSTRIAL APPLICABILITY

According to the present invention, a friction material which has high damping properties and acceptable brake noise, and does not exhibit a decrease in responsiveness when brakes are applied, a decrease in the feeling of effectiveness associated therewith, dragging occurring when the friction material is brought into contact with a brake rotor, a decrease in the fuel efficiency, and an increase in abrasion; and a method for producing the friction material, can be provided.

The invention claimed is:

1. A method for producing a friction material, the method comprising:
    a mixing step of mixing a friction material composition comprising fiber, friction adjusting material, binding material, and uncrosslinked rubber at a proportion of 0.5% to 5% by mass relative to the total amount of the friction material composition to obtain a mixture;
    a molding step of heat and press-molding the obtained mixture in a pressing direction to yield a molded product under conditions at which the binding material reacts and the uncrosslinked rubber flows perpendicularly to the pressing direction; and
    a heat-treating step of heat-treating the molded product to cure the binding material in the molded product,
    wherein an ambient compressibility is 2% or less when the friction material is compressed in a piston-pressing direction at normal temperature (25° C.) and at 4 MPa, and
    a tan δ value in a sliding direction at −20° C. to 50° C. is 0.05 or larger.

2. The method for producing the friction material according to claim 1, wherein in the mixing step, the uncrosslinked rubber is mixed with all materials of the friction material composition other than the uncrosslinked rubber.

3. The method for producing the friction material according to claim 1, wherein in the mixing step, the uncrosslinked rubber is mixed with a portion of materials of the friction material composition other than the uncrosslinked rubber, and then a mixed material is further mixed with a remaining material of the friction material composition.

4. The method for producing the friction material according to claim 1, wherein, in the molding step, the heat and press-molding is conducted at a temperature of 130° C. to 200° C.

5. The method for producing the friction material according to claim 1, wherein, in the molding step, the heat and press-molding is conducted at a molding pressure of 5 MPa to 40 MPa.

6. The method for producing the friction material according to claim 1, wherein, in the molding step, the heat and press-molding is conducted at a temperature of 130° C. to 200° C. and a molding pressure of 5 MPa to 40 MPa.

7. The method for producing the friction material according to claim 1, wherein, in the molding step, the heat and press-molding is conducted at a temperature of 130° C. to 200° C. and a molding pressure of 5 MPa to 40 MPa, for a molding time of 1 minute to 10 minutes.

\* \* \* \* \*